United States Patent
Lowell

(10) Patent No.: US 7,805,723 B2
(45) Date of Patent: *Sep. 28, 2010

(54) RUNTIME VIRTUALIZATION AND DEVIRTUALIZATION OF MEMORY BY A VIRTUAL MACHINE MONITOR

(75) Inventor: David E. Lowell, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2026 days.

This patent is subject to a terminal disclaimer.

(21) Appl. No.: 10/677,159

(22) Filed: Oct. 1, 2003

(65) Prior Publication Data

US 2005/0076156 A1    Apr. 7, 2005

(51) Int. Cl.
G06F 9/455 (2006.01)
G06F 21/00 (2006.01)
G06F 9/26 (2006.01)

(52) U.S. Cl. ................. 718/1; 711/6; 711/203
(58) Field of Classification Search ............ 718/1; 711/6, 203
See application file for complete search history.

(56) References Cited

U.S. PATENT DOCUMENTS

| | | | | |
|---|---|---|---|---|
| 4,843,541 A | * | 6/1989 | Bean et al. | 710/36 |
| 6,256,657 B1 | * | 7/2001 | Chu | 718/1 |
| 6,496,847 B1 | * | 12/2002 | Bugnion et al. | 718/1 |
| 6,789,156 B1 | * | 9/2004 | Waldspurger | 711/6 |
| 6,961,941 B1 | * | 11/2005 | Nelson et al. | 719/319 |

OTHER PUBLICATIONS

Virtualizing I/O Devices on VMware Workstation's Hosted Virtual Machine Monitor Lim et al. Proceedings of the 2001 USENIX Annual Technical Conference, 2001.*

Non-Final Office Action in U.S. Appl. No. 11/676,557, U.S.P.T.O., pp. 1-45 and Notice of References Cited (Oct. 21, 2008).

* cited by examiner

*Primary Examiner*—Lewis A Bullock, Jr.
*Assistant Examiner*—Mengyao Zhe

(57) ABSTRACT

A virtual machine monitor can be used to commence virtualization of computer memory at runtime. The virtual machine monitor can also be used to devirtualize computer memory at runtime.

60 Claims, 9 Drawing Sheets

RUNTIME VIRTUALIZATION AND DEVIRTUALIZATION OF MEMORY BY A VIRTUAL MACHINE MONITOR

BACKGROUND

A virtual machine monitor ("VMM") creates an environment that allows multiple operating systems to run simultaneously on the same computer hardware. In such an environment, applications written for different operating systems (e.g., Windows, Linux) can be run simultaneously on the same hardware.

Running an operating system on a VMM involves virtualizing one or more of the following types of hardware: memory, I/O devices, and CPU(s). CPUs and I/O devices can be virtualized in the traditional way: the hardware is configured to trap when an operating system ("OS") executes a privileged instruction, and the VMM simulates the completion of that instruction to maintain the illusion that the operating system has sole control of the hardware.

Memory virtualization typically involves two levels of translation, virtual-to-physical translation, which is defined by the OS, and physical-to-machine translation, which is defined by the VMM.

Traditional operating systems employ an abstraction of memory called "virtual" memory. When the OS or application accesses a virtual address, that address is translated into a "physical" address to allow the access to reach the real memory present in hardware. This translation is typically managed by the OS, but performed on the fly by the CPU.

The translation may be performed by dividing virtual and physical memory up into chunks called "pages". The OS defines the "virtual-to-physical" mapping, or V→P, that assigns a page of physical memory to hold the contents of a particular virtual page. This mapping usually takes the form of "page tables" containing "page table entries" (PTEs). Each PTE defines a mapping from a virtual page to a physical page (on some architectures, one PTE may map more than one page). The CPU maintains a cache of translations in a "translation lookaside buffer" or TLB. If a virtual address is accessed for which there is not a valid translation in the TLB, the appropriate PTE is read from the currently active page table (pointed to by the CPU's "page table base register"), and then loaded into the TLB. This fill operation upon a TLB miss can be performed in hardware on some architectures, or in software on others. Often, operating systems provide each of their processes (running applications) with a separate virtual address space, defining a separate virtual-to-physical mapping for each, and switching the virtual-to-physical mapping in effect when the OS changes the process that currently executes.

This virtual-to-physical translation alone suffices when the OS is not running on a VMM. However, when the OS is run on a VMM, the VMM maintains ultimate control over the use of the memory resources, and allows multiple operating systems to share the same pool of memory. To maintain this control, the VMM translates the OS's physical memory accesses into accesses to "machine" memory. Thus the physical memory is also employed as an abstraction, and the machine memory becomes the real memory hardware when the OS is run on a VMM. The VMM defines the "physical-to-machine" mapping, or P→M, and maintains control over the CPU's translation activities (e.g. by setting the page table base register, and/or handling TLB fills). The P→M mapping assigns a page of machine memory to each page of physical memory. Because most CPUs only have a single TLB, for performance reasons the VMM usually creates direct mappings of virtual pages to machine pages. The direct mapping can be created by composing dynamically the OS's V→P translations with the VMM's P→M translations. The VMM ensures that the TLB employs the composed V→M translations when translating virtual accesses.

When the OS runs without a VMM underneath, the term "physical memory" refers to the real memory present in hardware. When the OS runs on a VMM that virtualizes physical memory, the term "machine memory" refers to the real memory present hardware. This nomenclature is standard.

Traditional VMMs impose their physical-to-machine translation on the operating system from bootup to shutdown. Virtualizing physical memory adds overhead to the system. For example, dynamically composing the V→P translations with the P→M translations slows the OS's normal memory management. Overhead is also added by constantly trapping and simulating privileged instructions. This overhead can slow interrupt handling, increase the fraction of CPU bandwidth lost to software overhead, increase response time, and decrease perceived performance.

Since the VMM virtualizes the hardware from bootup to shutdown, overhead is incurred even while virtualization is not necessary (for example, when only a single OS instance is running on the hardware). Thus the VMM can add unnecessary overhead to the computer.

It would be desirable to reduce the unnecessary overhead of the VMM.

SUMMARY

A virtual machine monitor is running on computer hardware. The hardware includes machine memory. According to one aspect of the present invention, virtualization of the memory is commenced at runtime. According to another aspect of the present invention, the memory is devirtualized at runtime.

Other aspects and advantages of the present invention will become apparent from the following detailed description, taken in conjunction with the accompanying drawings, illustrating by way of example the principles of the present invention.

DETAILED DESCRIPTION

Figure 1:
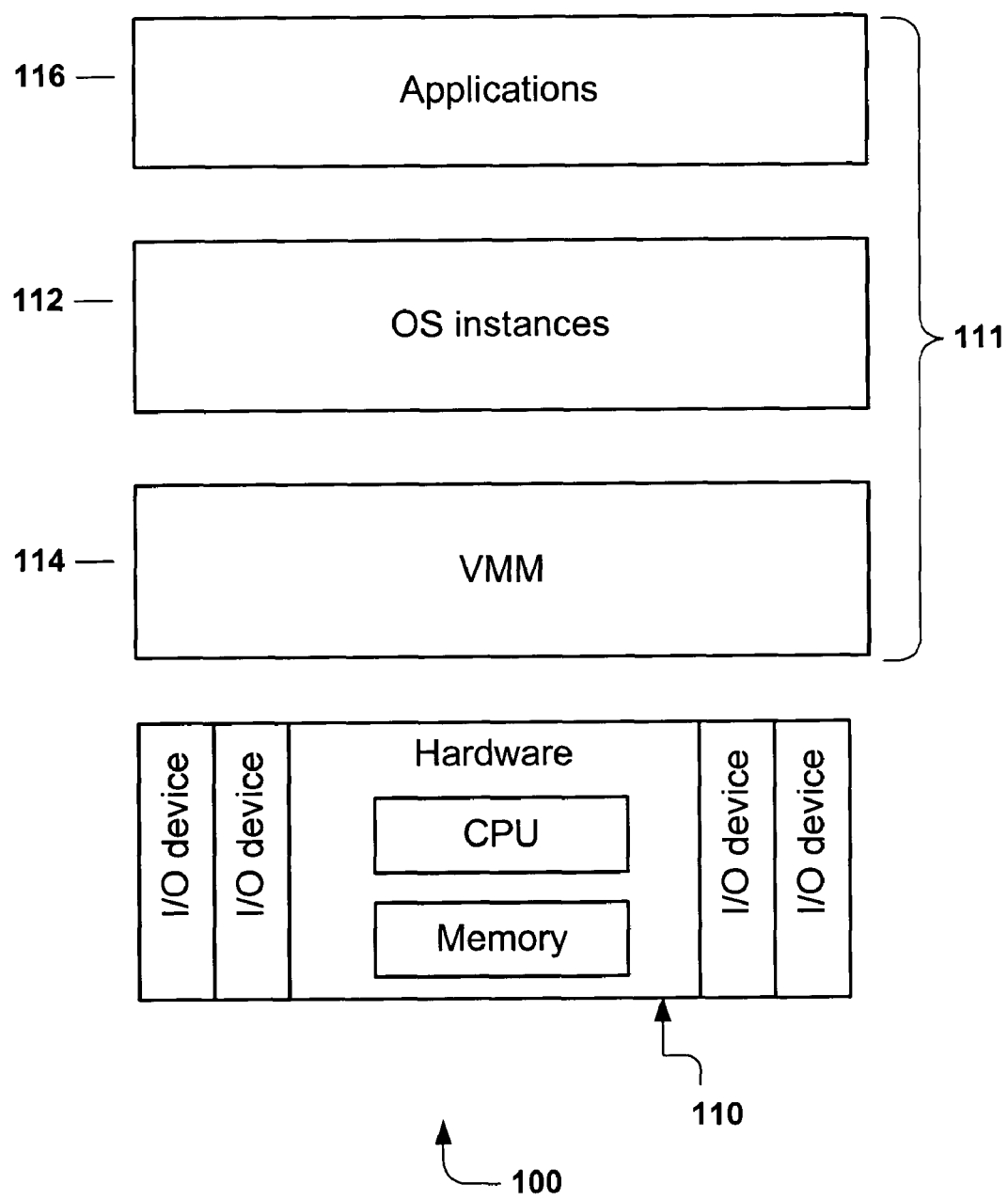
FIG. 1 is an illustration of hardware and software layers of a computer in accordance with an embodiment of the present invention.

As shown in the drawings for purposes of illustration, the present invention is embodied in a computer that runs a virtual machine monitor. The computer is not limited to any particular type. The computer can be, for example, a file server, web server, workstation, mainframe, personal computer, personal digital assistant (PDA), print server, or network appliance. The computer can be contained in a single box, or distributed among several boxes.

FIG. 1 shows different layers of an exemplary computer 100. The computer 100 has a raw hardware layer 110 and a software layer 111. The raw hardware layer 110 typically includes a central processing unit (CPU), memory and I/O devices. Exemplary I/O devices include, without limitation, network adapters, SCSI controllers, video cards, host bus adapters, and serial port adapters. The memory refers to the memory that is internal to the computer (e.g., internal memory cache, main system memory) as opposed to external storage devices such as disk drives.

The software layer 111 includes one or more OS instances 112, a VMM 114, and applications 116. The VMM 114 runs between the raw hardware layer 110 and the OS instances 112. The VMM 114 allows one or more OS instances 112 to run simultaneously. The applications 116 are run on the OS instance(s) 112. During execution, the software for the software layer 111 can be stored in "articles" such as the memory; and during distribution, the software can be stored in articles such as external devices, removable storage media (e.g., optical discs), etc.

The VMM 114 can commence virtualization of the physical memory at runtime. Such virtualization at runtime is referred to as "runtime virtualization of memory." The VMM 114 can also cease the virtualization of physical memory at runtime. Such cessation is referred to as "runtime devirtualization of memory." Runtime is the period of normal execution of the operating system after boot and before shutdown.

Figure 2:
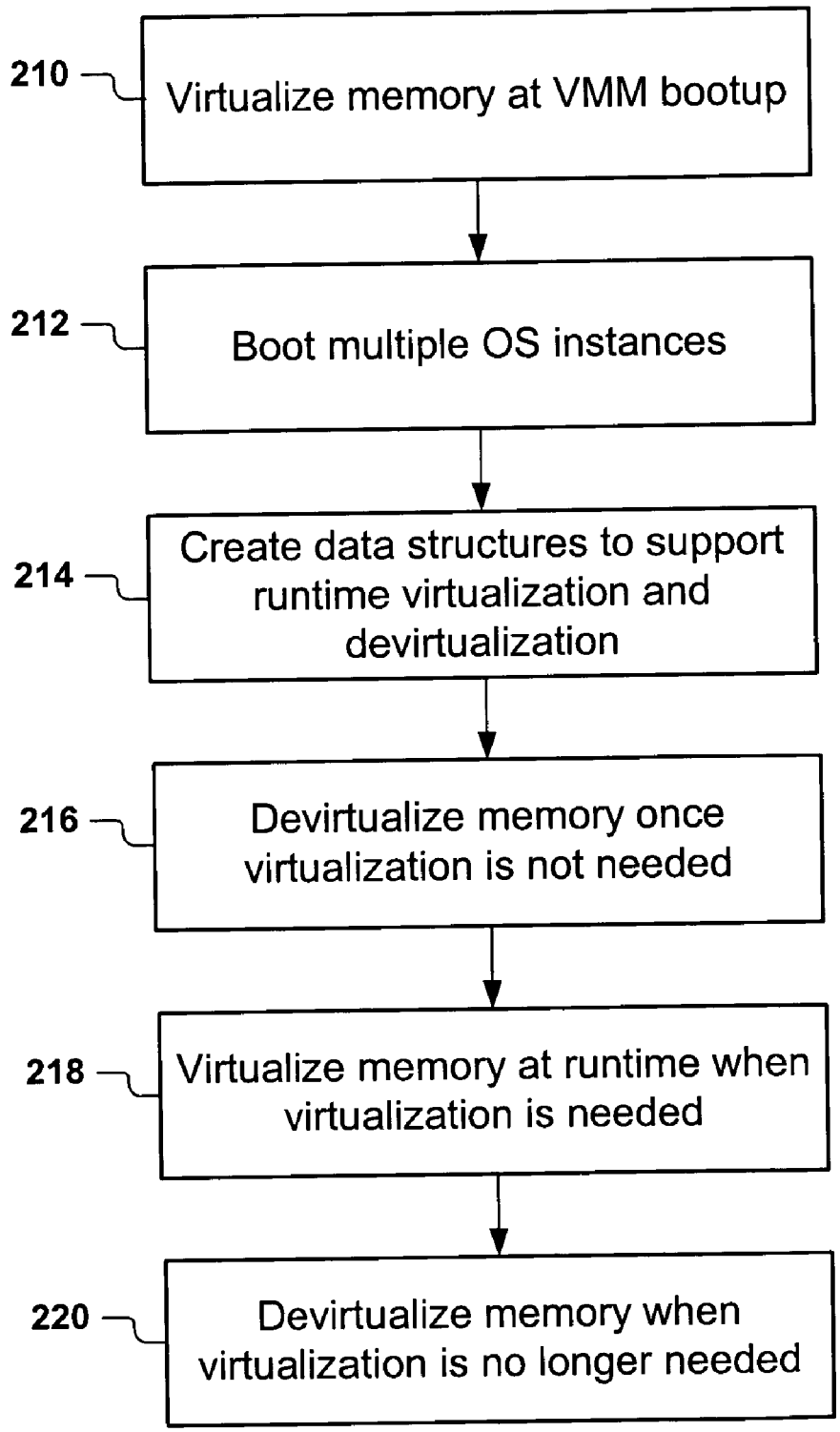
FIG. 2 is an illustration of a method of using a VMM in accordance with the present invention.

Reference is made to FIG. 2, which illustrates an exemplary method of performing runtime virtualization and devirtualization of memory. The VMM is booted on the hardware layer 110, and receives control of the hardware layer 110 at boot time (210). Thus the memory is virtualized.

Multiple OS instances can be run on the virtual machine (212). To support the runtime virtualization and devirtualization of memory, the VMM exposes to each OS instance physical memory no larger than machine memory. No extent of physical memory spans a "hole" in machine memory. In other words, for each page of physical memory exposed to the OS instance as it boots, there exists a page of machine memory with the same page frame number (i.e. address). If the VMM can map multiple pages of physical memory to the same page of machine memory, those physical pages are logically independent (e.g. marked read-only or "copy-on-write"). If the VMM exposes to the OS instance a physical page containing memory-mapped I/O devices, the VMM exposes that page at the same physical address as that page occurs in machine memory.

The VMM creates data structures that support runtime virtualization and devirtualization (214). The VMM may maintain a "back map" that contains for each page of machine memory a list of the pages of physical memory that map to it. The VMM runs in a range of machine memory such that the physical memory pages with the same page frame numbers are not exposed to the OS instance. Finally, the VMM maintains a list of free machine pages. Devirtualization can increase the amount of memory used by the system, and the VMM has enough free pages to support this increase. The free list may be sorted to allow the VMM to test efficiently whether a particular page of machine memory is free.

As an OS instance runs on the VMM, the VMM virtualizes memory by managing the P→M mapping. The VMM can take one page of machine memory away from the OS instance by picking a page p of physical memory (according to its page replacement policy, such as the "least recently used" page), writing the contents of that page to stable storage, updating the P→M mapping so that the physical page p no longer maps to any page of machine memory, and flushing any PTEs involving physical page p from the TLB. If later the OS instance accesses physical page p, that access will trap to the VMM (since the PTEs were flushed). The VMM can allocate a page of machine memory m from its list of free machine pages, read into that page from stable storage the prior contents of physical page p, then update the P M mapping to map physical page p to machine page m, and restart the instruction that caused the trap. Note that x and m may not be the same machine page, and that physical page p can map to almost any page of machine memory. The VMM can map several different pages of physical memory to the same machine page (if all the physical pages contain read-only data, for example). Thus the VMM can change the P→M mapping frequently, and physical pages may map to different machine pages over time.

Once the memory virtualization is not needed (for example, virtualization may no longer be needed when only a single OS runs), the memory may be devirtualized (216). Devirtualizing the memory reduces any unnecessary overhead associated with the virtualization of it. When it becomes necessary to virtualize the memory, the runtime virtualization is performed (218). When virtualization of the memory is no longer needed, the memory is devirtualized again (220).

Figure 3:
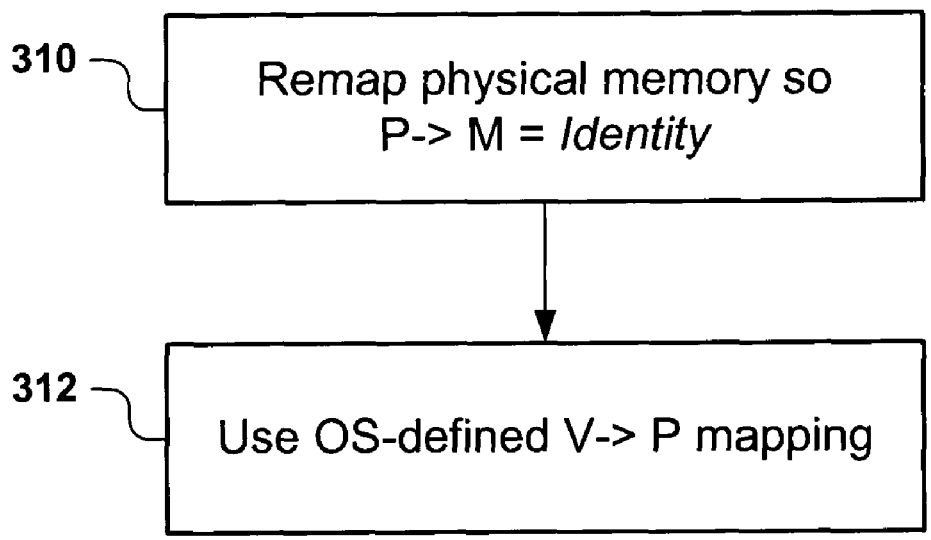
FIG. 3 is an illustration of a method of devirtualizing physical memory in accordance with an embodiment of the present invention.

Reference is now made to FIG. 3, which illustrates a method of devirtualizing physical memory. Physical memory is remapped so that the P→M mapping is the Identity mapping (310). An Identity mapping is a notion from mathematics in which each element in the mapping maps to itself. For example, in an Identity P→M mapping, for each mapped page of physical memory, if that page is at physical address x, then it is mapped to the page of machine memory at machine address x. The goal of this step is to move pages of machine memory around and rewrite the P→M mapping so that, when finished, each page of physical memory maps to the page of machine memory with the same page frame number. The Identity mapping may be constructed at runtime or before runtime.

Figure 4A:
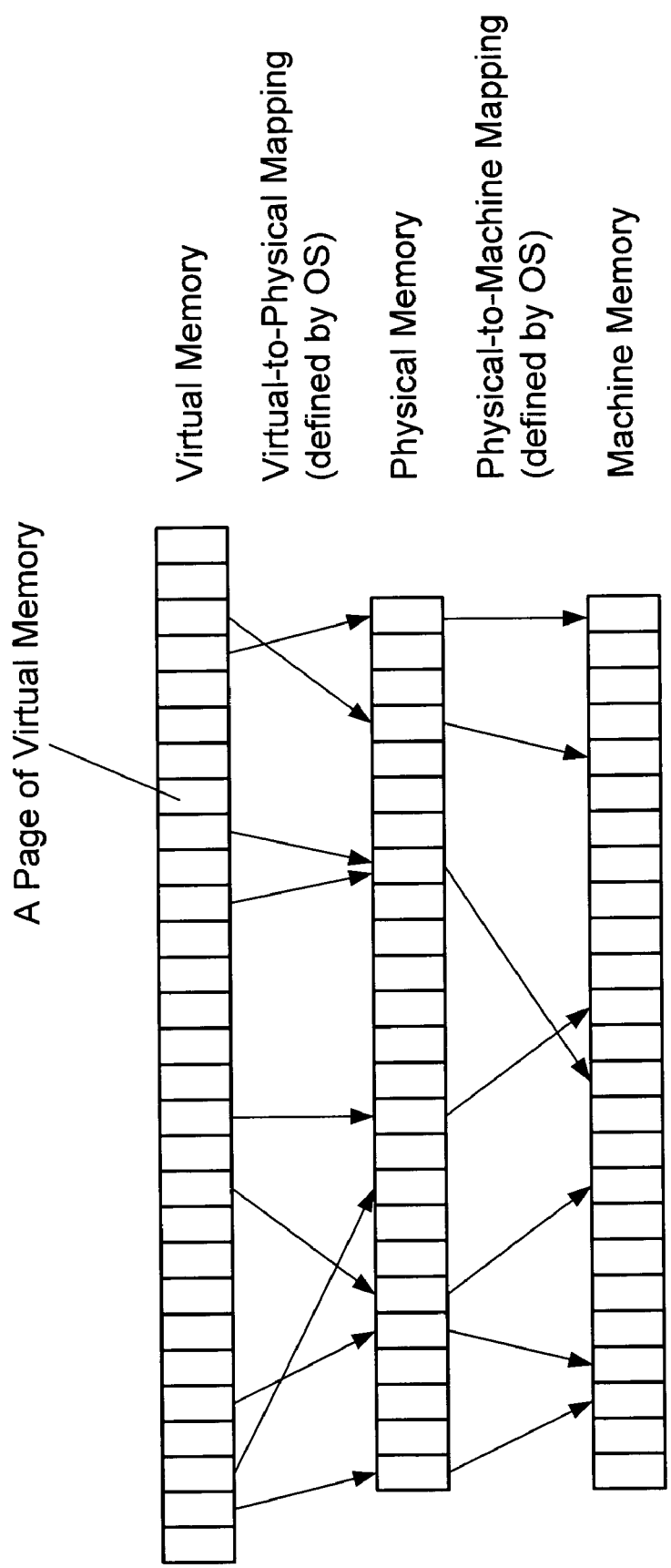
FIGS. 4a and 4b are illustrations of memory before and after remapping.

FIG. 4a illustrates virtual memory, physical memory and machine memory before remapping. The OS defines the V→P mapping and the P→M mapping. Each page of physical memory can map to a page of machine memory having a different page frame number.

Figure 4B:
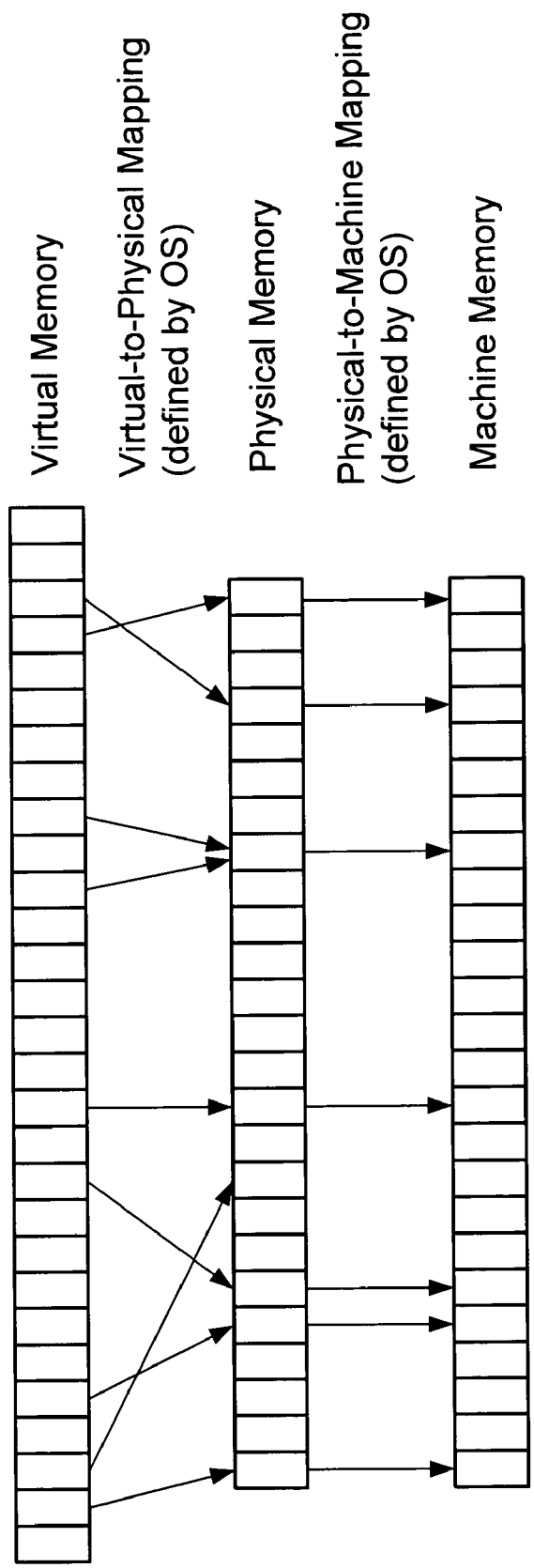

FIG. 4b illustrates the virtual memory, the physical memory and the machine memory after remapping. Each page of physical memory maps to a page of machine memory having the same page frame number.

Returning to FIG. 3, the computer is configured to translate virtual memory accesses using directly the V→P mapping defined by the operating system (312). Different platforms and architectures may have different requirements for configuring the computer. On some platforms, directly using the OS's V→P mapping involves setting the CPU's "page table base register" to point to the OS's page table(s). On other platforms, the VMM's TLB miss routine loads the OS's PTEs into the TLB, without further composing them with the VMM's own P→M mapping. On other platforms, the hardware may be reconfigured to invoke a TLB fill routine in the OS instead of in the VMM.

Figure 5:
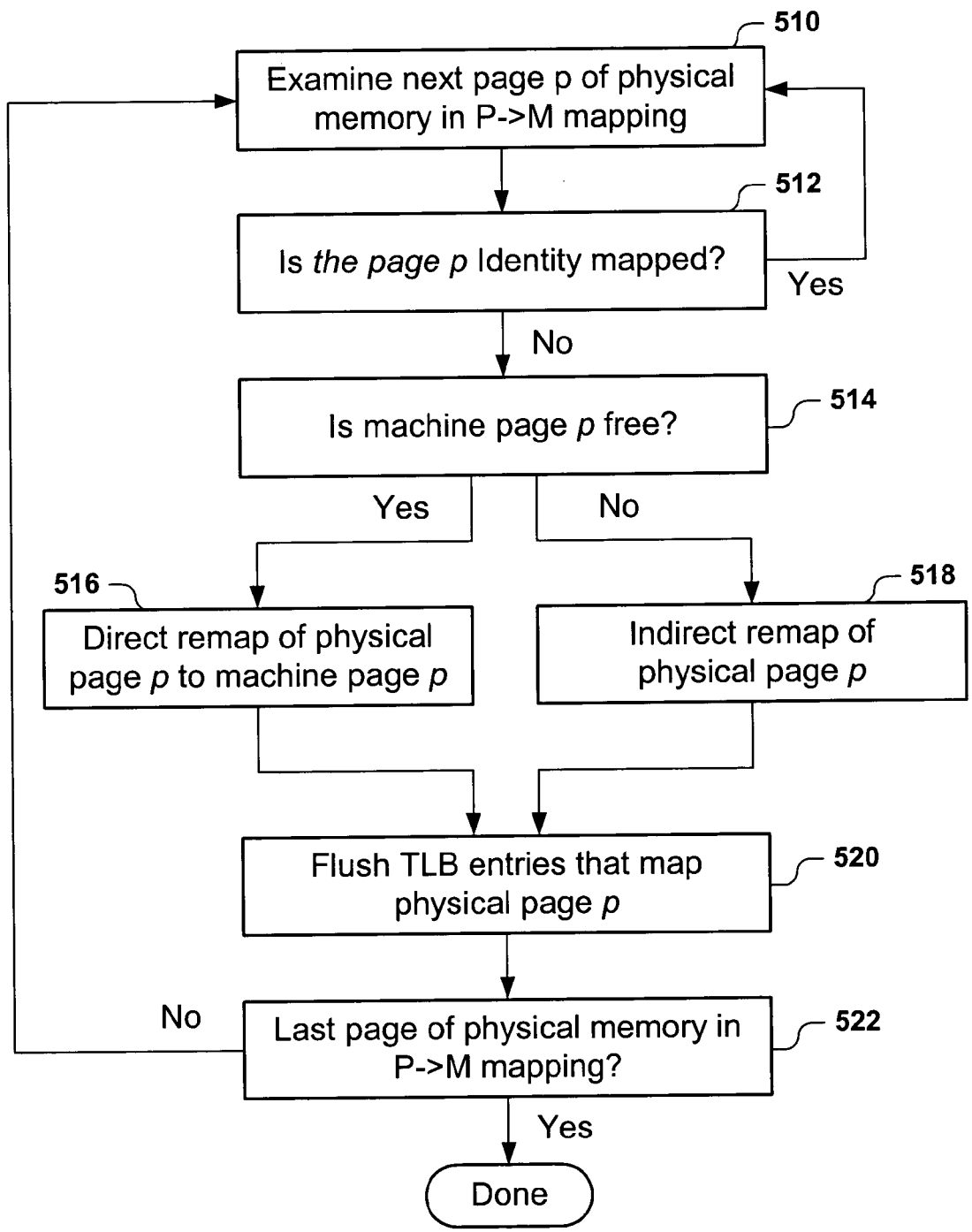
FIG. 5 is an illustration of a method of remapping physical memory in accordance with an embodiment of the present invention.

Reference is next made to FIG. 5, which illustrates an exemplary method of remapping physical memory so the P→M mapping becomes the Identity mapping. This method can be carried out by the VMM. In this exemplary method, all memory accesses by the operating system and applications are paused during remapping.

The VMM examines each page of physical memory that is mapped in the P→M mapping (510). If a physical page p is mapped to machine page p in the P→M mapping, and no other physical pages are mapped to machine page p (512), then the physical page p is already mapped via the Identity mapping and remapping can continue with the next physical page (510). If physical page p is not already Identity-mapped (512), the VMM searches its list of free machine pages to see whether machine page p is free (514). If the machine page p is free, the physical page p is directly remapped to machine page p (516). Otherwise, the physical page p is remapped in an indirect manner, after first remapping those physical pages that map to machine page p (518). Once physical page p has been remapped to machine page p, existing translations involving physical page p are flushed from the TLB (520). The translations for page p may be flushed by having the VMM flush the entire TLB. However, some architectures allow the VMM to flush only those translations that involve physical page p. Since the TLB typically caches V→M translations (V→P translations composed with P→M translations), and the OS may choose to map more than one virtual page to the same physical page, the VMM may have to flush more than one PTE in the TLB involving physical page p. The remapping is finished when each physical page in the P→M mapping is mapped to a page in machine memory having the same page frame number (522).

Figure 6:
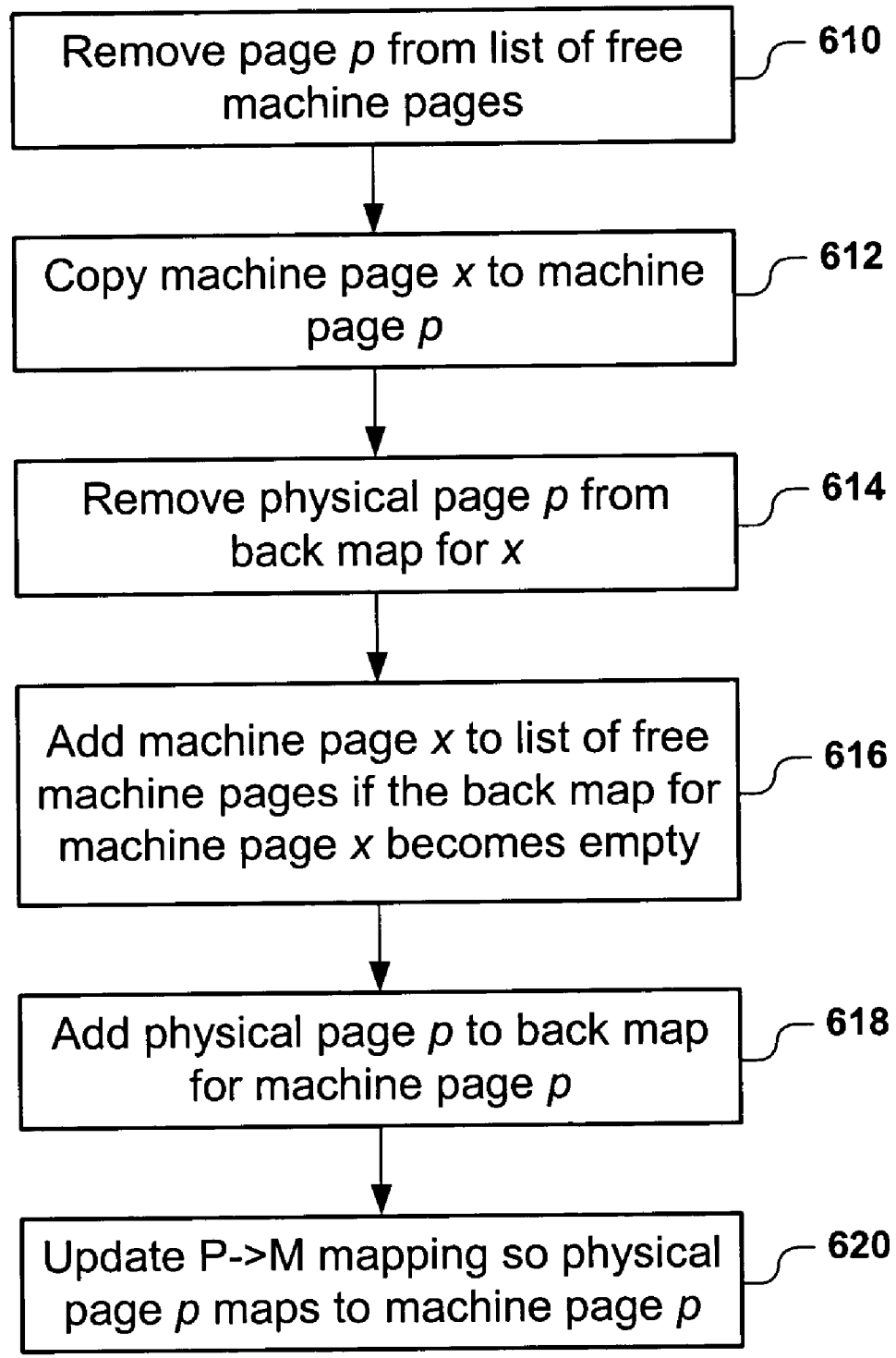
FIG. 6 is an illustration of a particular step in the remapping method of FIG. 5.

Reference is now made to FIG. 6, which illustrates how the VMM can directly remap physical page p to machine page p. The VMM removes machine page p from its list of free machine pages (610). Next, the VMM copies machine page x to machine page p, where x is the machine page to which p is mapped in the P→M mapping (612). The VMM then removes physical page p from the list of pages in the back map for machine page x (614), and if that list becomes empty, adds machine page x to the list of free machine pages (616). The VMM then adds physical page p to the back map for machine page p (618), and updates the P→M mapping to map physical page p to machine page p (620).

Figure 7A:
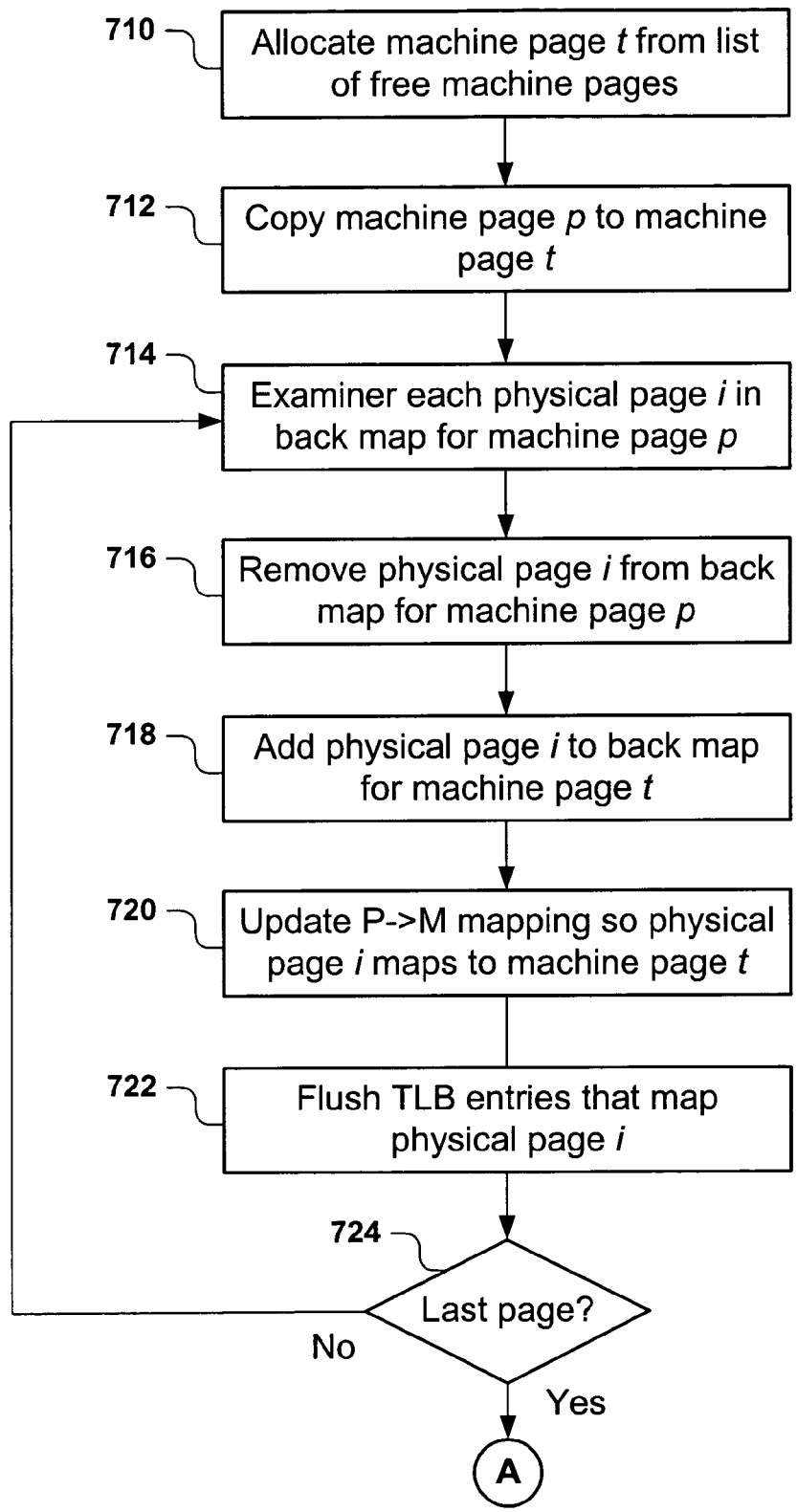
FIGS. 7a-7b are illustrations of another step in the remapping method of FIG. 5.
Figure 7B:
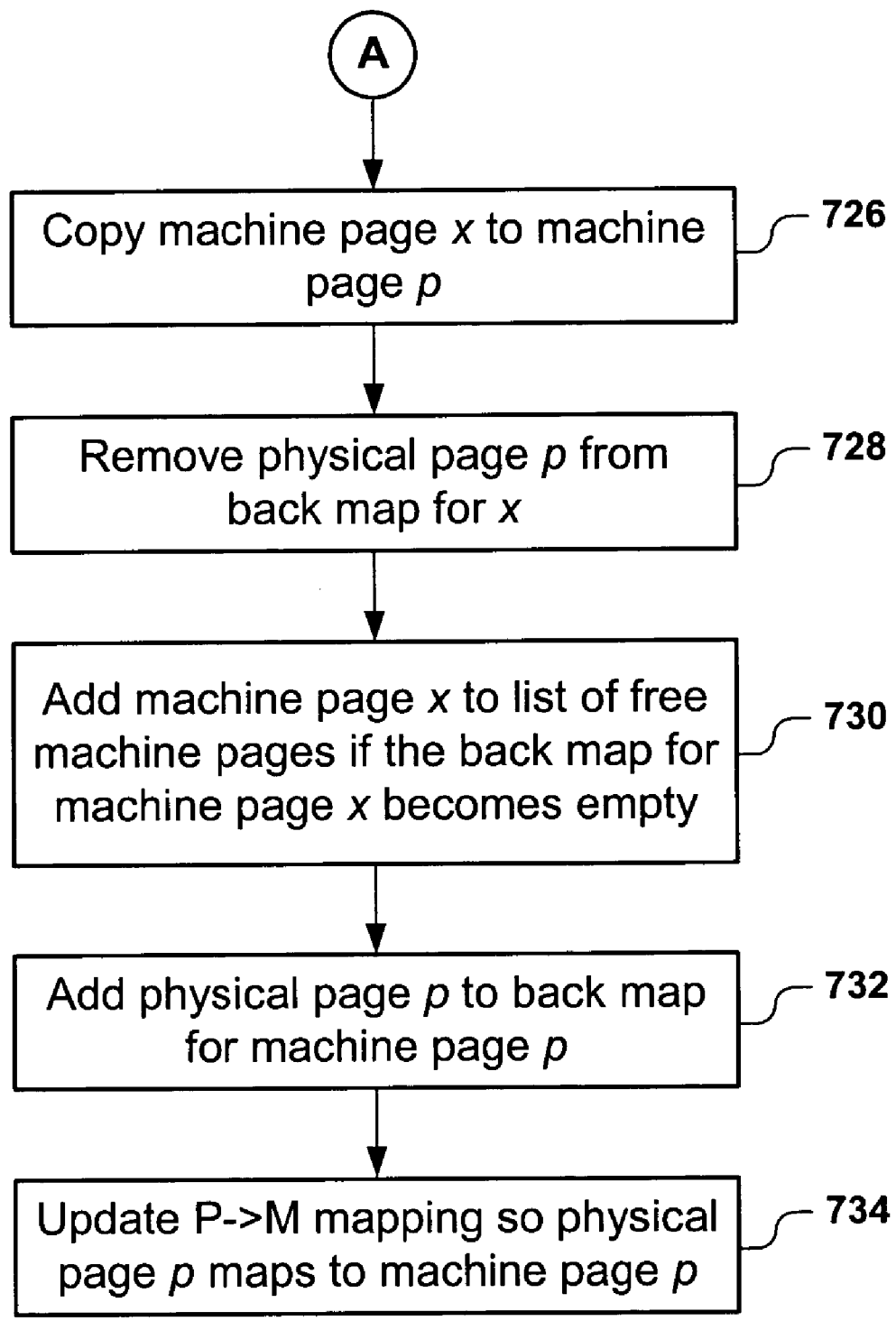

Reference is now made to FIGS. 7a-7b, which illustrate how the VMM can remap physical page p indirectly by first remapping those pages that already map to machine page p. The VMM first allocates a free page t from its list of free machine pages (710), and copies machine page p to machine page t (712). Next, the VMM examines each physical page i in the list of pages in the back map for machine page p (714). The VMM removes physical page i from machine page p's back map (716), adds physical page i to the back map for machine page t (718), and updates the P→M mapping so physical page i maps to machine page t (720). The VMM ensures that the updated mapping for physical page i takes effect (722). For instance, the VMM can flush the entire TLB, or flush just those cached translations that involve physical page i.

Once all the pages in machine page p's back map have been remapped (524), the VMM can then remap physical page p in much the same manner as in the direct remapping. The VMM copies machine page x to machine page p, where x is the machine page to which p is mapped in the P→M mapping (726). The VMM then removes physical page p from the list of pages in the back map for machine page x (728), and if that list becomes empty, adds machine page x to the list of free machine pages (730). The VMM then adds physical page p to the back map for machine page p (732), and updates the P→M mapping to map physical page p to machine page p (734).

The devirtualization described above takes place while OS and application processing are paused. However, the method is not so limited. The VMM can be designed to perform devirtualization concurrently with OS and application processing. While remapping physical page p, the VMM should ensure that other VMM threads do not modify entries involving p in the P→M mapping and the back map (for example, the VMM may acquire and hold a lock for page p while p is remapped). Once page p has been remapped for the Identity mapping, the VMM should ensure either the mapping for p is not modified before allowing an OS instance to directly manage memory translation (312), or that page p is again considered a candidate for remapping (510). Finally, the VMM temporarily prevents write access by the OS instance or application to virtual or physical pages while their backing machine pages are copied and the mappings to those machine pages are updated. This write access should be prevented during the windows of time between the initiation of step 612 and the completion of step 520, between the initiation of step 712 and the completion of step 724, and between the initiation of step 726 and the completion of step 520.

Figure 8:
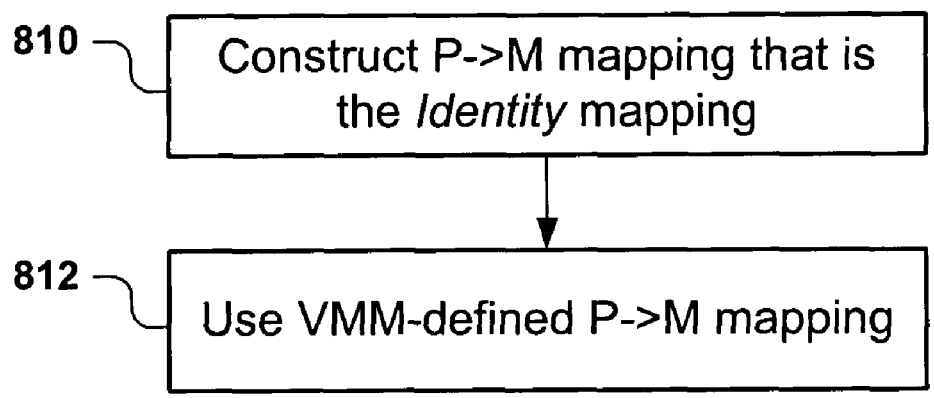
FIG. 8 is an illustration of a method of virtualizing memory at runtime.

Reference is now made to FIG. 8, which illustrates a method of virtualizing memory at runtime, where the VMM already has control of the CPU. For example, the VMM runs in a more privileged mode to get control on key hardware traps. In the alternative, the VMM previously devirtualized memory, but not the CPU. OS and application processing may be paused while the memory is virtualized.

To perform runtime virtualization of memory, the VMM constructs an initial P→M mapping that is the Identity mapping (810). At the completion of this step, each physical page known to the OS instance is mapped in P→M to the machine page with the same page frame number. The VMM may also initialize its back map such that for each page of machine memory mapped in P→M, the back map of that page contains only the page of physical memory with the same page frame number.

The VMM also configures the hardware to translate virtual memory accesses using the VMM's P→M mapping in addition to the OS instance's V→P mapping (812). Configuring the hardware may involve setting the CPU's page table base register to point to page tables maintained by the VMM. The configuration may also involve having the VMM's TLB miss routine commence composing the VMM's P→M translations with the OS instance's V→P translations. The hardware may also be configured to invoke a TLB fill routine in the VMM rather than in an OS instance. At the completion of these steps (810 and 812), physical memory is virtualized. OS and Application processing can resume.

Although the P→M mapping is initially the Identity mapping, once physical memory is virtualized, the VMM is free to change over time how physical memory maps to machine memory.

The VMM can be designed to support the runtime virtualization and devirtualization of only a portion of physical memory. When devirtualizing a portion of physical memory, the VMM may remap in the manner depicted in FIG. 5 only those physical pages to be devirtualized. Once those pages are mapped in P→M via the Identity mapping, the VMM can cease composing V→P translations with the VMM's P→M translations for the range of physical memory that has been devirtualized, and can allow the hardware to directly employ the OS instance's V→P translations in that range.

The VMM can support runtime virtualization of a portion of physical memory by constructing an initial Identity P M mapping for that range of physical memory, and commencing the composition of the OS instance's V→P translations with the VMM's P→M translations in that range of physical memory.

In the methods described above, the VMM maintains a back map detailing which physical pages map to each page of machine memory. However, the VMM is not so limited. Instead of maintaining a machine memory back map and querying the back map to determine whether a machine page should be added to the free list, the VMM may instead maintain a reference count for machine page x, and free it when the reference count of machine page x reaches zero. The VMM may also search the P→M mapping to see whether any physical pages still map to machine page x and free those physical pages if the VMM finds none. Similarly, the VMM may construct the list of pages in step 714 by searching through the P→M mapping for those physical pages mapped to machine page p.

The remapping of physical memory during devirtualization is not performed for physical pages containing I/O addresses if the VMM already maps those physical pages to machine pages at the same address (that is, if I/O space is already Identity-mapped).

Thus disclosed is a VMM that can reduce unnecessary overhead. An operating system need not be modified to run on the VMM or designed for that purpose, but instead may be a commodity operating system without special support for running in a virtual machine (such as Microsoft Windows, Linux, Tru64 Unix, etc.). Similarly, the raw hardware layer need not provide special support for the VMM. The VMM can work on commodity hardware not having features that help or accelerate virtualization (such as Intel x86, Intel Itanium, and HP Alpha processors).

The present invention is not limited to the specific embodiments described and illustrated above. Instead, the present invention is construed according to the claims that follow.

The invention claimed is:

1. A method of running a virtual machine monitor on computer hardware, the hardware including memory, the method comprising:
   accessing the memory by using virtual memory to physical memory translations provided by an operating system and not by any mapping associated with the virtual machine monitor;
   receiving a command to commence virtualization of the memory during runtime of the operating system, wherein virtualization of the memory at runtime includes:
      constructing, by the virtual machine monitor, an Identity mapping of physical to machine memory; and
      configuring, by the virtual machine monitor, the computer hardware to use the Identity mapping when accessing the memory.

2. The method of claim 1, wherein the memory translation is initially performed according to the Identity mapping.

3. The method of claim 2, wherein the virtual machine monitor modifies the mapping after the physical memory has been virtualized.

4. The method of claim 1, wherein the memory translation is managed by allowing the operating system to define virtual-to-physical mapping, and the virtual machine monitor to define physical-to machine mapping.

5. The method of claim 1, wherein the virtual machine monitor dynamically composes virtual-to-physical translations with physical-to-machine translations.

6. The method of claim 4, wherein the virtual machine monitor inspects the virtual-to-physical mappings by the operating system and maintains page tables of virtual-to-machine mappings.

7. The method of claim 4, further comprising loading a translation lookaside buffer with virtual-to-machine translations.

8. The method of claim 1, wherein only a portion of physical memory is virtualized at runtime.

9. The method of claim 1, wherein the hardware includes a CPU that was virtualized prior to the virtualization of the memory.

10. The method of claim 1, further comprising performing runtime devirtualization of the virtualized memory.

11. A method of running a virtual machine monitor on computer hardware and an operating system on the virtual machine monitor, the hardware including memory, wherein the memory is accessed by translating virtual memory into physical memory by the operating system and translating the physical memory into machine memory by the virtual machine monitor, the method comprising:
   dynamically composing, by the virtual machine monitor, virtual-to-physical translations with physical-to-machine translations;
   receiving a command to devirtualize the memory at runtime of the operating system, wherein devirtualizing the memory at runtime includes:
   remapping physical memory to change a physical-to-machine mapping to an Identity mapping;
   ceasing the virtual machine monitor from performing the dynamic composition of translations; and
   using the operating system to manage address translation with respect to the devirtualized memory.

12. The method of claim 11, wherein a portion of the memory is devirtualized.

13. The method of claim 11, wherein when the operating system is booted, the virtual machine monitor exposes the booting operating system to physical memory no larger than machine memory, where the physical memory does not span any memory holes.

14. The method of claim 11, wherein the operating system defines virtual-to-physical translations prior to the runtime devirtualization; wherein the virtual machine monitor defines physical-to-machine translations prior to the runtime devirtualization; wherein the virtual machine monitor composes dynamically the virtual-to-physical translations with the physical-to-machine translations prior to the runtime devirtualization.

15. The method of claim 11, wherein pages of physical memory that are already Identity-mapped are not remapped, and wherein at least some other pages of physical memory are remapped directly.

16. The method of claim 11, wherein pages of physical memory that are already Identity-mapped are not remapped, and wherein at least some other pages of physical memory are remapped indirectly.

17. The method of claim 11, wherein the remapping of the physical memory is performed concurrently with operating system and application activity.

18. The method of claim 17, further comprising preventing the physical-to-machine mapping from being modified during the remapping, and temporarily preventing some or all write accesses to memory.

19. The method of claim 11 wherein the operating system and any application activity is paused while the remapping is performed.

20. The method of claim 11, further comprising maintaining a back map that contains for each page of machine memory a list of the pages of physical memory that map to it, and a list of free machine pages.

21. The method of claim 11, wherein the remapping is performed without a back map by maintaining a reference count for each machine page is kept, and freeing machine pages when their reference counts are zero.

22. The method of claim 11, wherein the remapping is performed without a back map by constructing a list of the physical pages mapping to a page of machine memory by searching the physical-to-machine mapping.

23. The method of claim 11, wherein managing the address translation includes having the virtual machine monitor cease to inspect the operating system's virtual-to-physical translations; and ceasing to maintain a page table of direct virtual-to-machine mappings.

24. The method of claim 11, wherein managing the address translation includes having the virtual machine monitor cease to compose dynamically the operating system's virtual-to-physical translations with the virtual machine monitor's physical-to-machine translations for a portion of physical memory that is devirtualized.

25. A computer comprising:
memory, wherein the memory is accessed by using virtual memory to physical memory translations provided by an operating system and not by any mapping associated with a virtual machine monitor;
the virtual machine monitor configured to commence virtualization of the memory during runtime of the operating system, wherein virtualization of the memory at runtime includes:
constructing, by the virtual machine monitor, an Identity mapping of physical to machine memory; and
configuring, by the virtual machine monitor, the computer to use the Identity mapping when accessing the memory.

26. The computer of claim 25, wherein the virtual machine monitor modifies the mapping after the physical memory has been virtualized.

27. The computer of claim 25, wherein an operating system is running on the virtual machine monitor prior to virtualizing the memory; and wherein the memory translation is managed by allowing the operating system to manage virtual-to-physical mapping, and allowing the virtual machine monitor to manage physical-to machine mapping.

28. The computer of claim 25, wherein the virtual machine monitor dynamically composes virtual-to-physical translations with the physical-to-machine translations.

29. The computer of claim 25, wherein the virtual machine monitor inspects the virtual-to-physical mappings by the operating system and maintains page tables of virtual-to-machine mappings.

30. The computer of claim 25, wherein a translation lookaside buffer is loaded with the virtual-to-machine translations.

31. The computer of claim 25, wherein only a portion of physical memory is virtualized at runtime.

32. An article for a computer, the article comprising computer memory storing:
instructions for accessing a portion of the memory by using virtual memory to physical memory translations provided by an operating system and not by any mapping associated with a virtual machine monitor;
the virtual machine monitor configured to commence virtualization of the portion of the memory during runtime of the operating system, wherein virtualization of the portion of the memory at runtime includes:
constructing, by the virtual machine monitor, an Identity mapping of physical to machine memory; and
configuring, by the virtual machine monitor, the computer to use the Identity mapping when accessing the portion of the memory.

33. The article of claim 32, wherein the virtual machine monitor can modify the mapping after the physical memory has been virtualized.

34. The article of claim 32, wherein the memory translation is managed by allowing an operating system to manage virtual-to-physical mapping, and allowing the virtual machine monitor to manage physical-to machine mapping.

35. The article of claim 34, wherein the virtual machine monitor can dynamically compose virtual-to-physical translations with the physical-to-machine translations.

36. The article of claim 34, wherein the virtual machine monitor can inspect the virtual-to-physical mappings by the operating system and maintains page tables of virtual-to-machine mappings.

37. The article of claim 32, wherein the virtual machine monitor can load a translation lookaside buffer with virtual-to-machine translations.

38. The article of claim 32, wherein the virtual machine monitor can virtualize only a portion of physical memory at runtime.

39. A computer comprising:
hardware including memory;
a virtual machine monitor configured to virtualize the memory and devirtualize the memory at runtime, wherein prior to virtualizing the memory, the memory is accessed by using virtual memory to physical memory translations provided by an operating system and not by any mapping associated with the virtual machine monitor;
wherein virtualization of the memory at runtime includes:
constructing, by the virtual machine monitor, an Identity mapping of physical to machine memory;
configuring, by the virtual machine monitor, the computer hardware to use the Identity mapping when accessing the memory, such that the virtual machine monitor dynamically composes virtual-to-physical translations with physical-to-machine translations;
wherein devirtualizing the memory at runtime includes:
remapping physical memory to change a physical-to-machine mapping to an Identity mapping;
ceasing the virtual machine monitor from performing the dynamic composition of translations; and
using the operating system to manage address translation with respect to the devirtualized memory.

40. The computer of claim 39, wherein a portion of the memory is devirtualized.

41. The computer of claim 39, wherein when an operating system is booted, the virtual machine monitor exposes the booting operating system to physical memory no larger than machine memory, where the physical memory does not span any memory holes.

42. The computer of claim 39, wherein an operating system defines virtual-to-physical translations prior to the runtime devirtualization; wherein the virtual machine monitor defines physical-to-machine translations prior to the runtime devirtualization.

43. The computer of claim 42, wherein pages of physical memory that are already Identity-mapped are not remapped, and wherein at least some other pages of physical memory are remapped directly.

44. The computer of claim 42, wherein pages of physical memory that are already Identity-mapped are not remapped, and wherein at least some other pages of physical memory are remapped indirectly.

45. The computer of claim 42, wherein the remapping of the physical memory is performed concurrently with operating system and application activity.

46. The computer of claim 45, wherein the physical-to-machine mapping is prevented from being modified during the remapping, and some or all write accesses to memory are temporarily prevented.

47. The computer of claim 42, wherein the operating system and any application activity is paused while the remapping is performed.

48. The computer of claim 42, wherein managing the address translation includes having the virtual machine monitor cease to inspect the operating system's virtual-to-physical translations; and wherein maintenance of a page table of direct virtual-to-machine mappings is ceased.

49. The computer of claim 42, wherein managing the address translation includes having the virtual machine monitor cease to compose dynamically the operating system's virtual-to-physical translations with the virtual machine monitor's physical-to-machine translations for a portion of physical memory that is devirtualized.

50. An article for a computer, the article comprising memory storing instructions for execution by at least one computer processor, the instructions when executed cause the computer processor to perform the steps of:
  dynamically composing, by a virtual machine monitor, virtual-to-physical translations with physical-to-machine translations;
  receiving a command to devirtualize a portion of the computer memory at runtime of an operating system, wherein devirtualizing the portion of the computer memory at runtime includes:
  remapping physical memory to change a physical-to-machine mapping to an Identity mapping;
  ceasing the virtual machine monitor from performing the dynamic composition of translations; and
  using the operating system to manage address translation with respect to the devirtualized memory.

51. The article of claim 50, wherein the software causes a portion of the memory to be devirtualized.

52. The article of claim 50, wherein the software includes a virtual machine monitor; and wherein when an operating system is booted on the virtual machine monitor, the virtual machine monitor exposes the booting operating system to physical memory no larger than machine memory, where the physical memory does not span any memory holes.

53. The article of claim 50, wherein an operating system defines virtual-to-physical translations prior to the runtime devirtualization; wherein the software includes a virtual machine monitor for defining physical-to-machine translations prior to the runtime devirtualization, composing dynamically the virtual-to-physical translations with the physical-to-machine translations prior to the runtime devirtualization, and wherein after the runtime devirtualization is performed, memory translation is performed by directly using the virtual-to-physical mapping defined by the operating system.

54. The article of claim 52, wherein pages of physical memory that are already Identity-mapped are not remapped, and wherein at least some other pages of physical memory are remapped directly.

55. The article of claim 42, wherein pages of physical memory that are already Identity-mapped are not remapped, and wherein at least some other pages of physical memory are remapped indirectly.

56. The article of claim 42, wherein the remapping of the physical memory is performed concurrently with operating system and application activity.

57. The article of claim 56, wherein the physical-to-machine mapping is prevented from being modified during the remapping, and some or all write accesses to memory are temporarily prevented.

58. The article of claim 42, wherein the operating system and any application activity is paused while the remapping is performed.

59. The article of claim 42, wherein the software includes a virtual machine monitor that manages the address translation by ceasing to inspect the operating system's virtual-to-physical translations; and wherein maintenance of a page table of direct virtual-to-machine mappings is ceased.

60. The article of claim 42, wherein the software includes a virtual machine monitor for managing the address translation by ceasing to compose dynamically the operating system's virtual-to-physical translations with the virtual machine monitor's physical-to-machine translations for a portion of physical memory that is devirtualized.

* * * * *

UNITED STATES PATENT AND TRADEMARK OFFICE
CERTIFICATE OF CORRECTION

PATENT NO. : 7,805,723 B2
APPLICATION NO. : 10/677159
DATED : September 28, 2010
INVENTOR(S) : David E. Lowell Page 1 of 1

It is certified that error appears in the above-identified patent and that said Letters Patent is hereby corrected as shown below:

In column 8, line 65, in Claim 19, delete "claim 11" and insert -- claim 11, --, therefor.

In column 9, line 47, in Claim 28, delete "claim 25," and insert -- claim 27, --, therefor.

In column 9, line 50, in Claim 29, delete "claim 25," and insert -- claim 27, --, therefor.

In column 9, line 54, in Claim 30, delete "claim 25," and insert -- claim 27, --, therefor.

In column 10, lines 62-63, in Claim 42, delete "devirtualization." and insert -- devirtualization; wherein the virtual machine monitor composes dynamically the virtual-to-physical translations with the physical-to-machine translations prior to the runtime devirtualization. --, therefor.

Signed and Sealed this
Twenty-seventh Day of March, 2012

David J. Kappos
*Director of the United States Patent and Trademark Office*